(12) United States Patent
Maltz

(10) Patent No.: US 7,907,697 B2
(45) Date of Patent: Mar. 15, 2011

(54) SYSTEM TO ESTIMATE X-RAY SCATTER

(75) Inventor: Jonathan S. Maltz, Oakland, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 139 days.

(21) Appl. No.: 12/196,106

(22) Filed: Aug. 21, 2008

(65) Prior Publication Data

US 2010/0046696 A1 Feb. 25, 2010

(51) Int. Cl.
*A61B 6/00* (2006.01)

(52) U.S. Cl. .............................................. 378/7; 378/86

(58) Field of Classification Search ................ 378/7, 86
See application file for complete search history.

(56) References Cited

U.S. PATENT DOCUMENTS

| | | | | |
|---|---|---|---|---|
| 5,430,787 | A | * | 7/1995 | Norton ............................. 378/87 |
| 5,615,279 | A | * | 3/1997 | Yoshioka et al. ............. 382/131 |
| 6,563,906 | B2 | * | 5/2003 | Hussein et al. ................. 378/89 |
| 2004/0202280 | A1 | * | 10/2004 | Besson ........................... 378/37 |
| 2004/0202360 | A1 | * | 10/2004 | Besson ........................... 382/131 |
| 2005/0243963 | A1 | * | 11/2005 | Ghelmansarai et al. .......... 378/7 |

OTHER PUBLICATIONS

Rogers et al., "BEAMnrc Users Manual", NRCC Report PIRS-0509(A)revK, Feb. 13, 2007.
Kawrakow et al., "The EGSnrc Code System: Monte Carlo Simulation of Electron and Photon Transport", NRCC Report PIRS-701, Nov. 7, 2003.
Steven L. Fritz et al., "A comparison of computed and measured heel effect for various target angles", Medical Physics, vol. 9, No. 2, Mar./Apr. 1982, pp. 216-219, (total 7pgs.).
A. P. Colijn et al., "Accelerated Simulation of Cone Beam X-Ray Scatter Projections", IEEE Transactions on Medical Imaging, vol. 23, No. 5, May 2004, pp. 584-590, (total 7pgs.).
H. Dong et al., "the Hounsfield Unit (HU) Accuracy in Varian's Cone-Beam CT (CBCT) and Its Effect On Dosimetric Verification", SU-FF-J-124, 2006 AAPM Meeting Program, Medical Physics, vol. 33, No. 6, Jun. 2006, p. 2049, (total 1pg.).
B. Faddegon et al., "Comparison of beam characteristics of a gold x-ray target and a tungsten replacement target", Medical Physics, vol. 31, No. 1, Jan. 2004, © 2004 Am. Assoc. Phys. Med., pp. 91-97, (total 7pgs.).
L. A. Feldkamp et al., "Practical cone-beam algorithm", J. Optical Society of America, vol. 1, No. 6, Jun. 1984, pp. 612-619 (total 8pgs.).
Vibeke N. Hansen et al., "Extraction of primary signal from EPIDs using only forward convolution", Medical Physics, vol. 24, No. 9, Sep. 1997, © 1997 Am. Assoc. Phys. Med., pp. 1477-1484 (total 8pgs.).
David G. Kruger et al., "A regional convolution kernel algorithm for scatter correction in dual-energy images: Comparison to single-kernel algorithms", Medical Physics, vol. 21, No. 2, Feb. 1994, © 1994 Am. Assoc. Phys. Med., pp. 175-184 (total 10pgs.).

(Continued)

*Primary Examiner* — Edward J Glick
*Assistant Examiner* — Alexander H Taningco

(57) ABSTRACT

A system may include determination of a first scatter kernel based on a first energy, a material-equivalent radiological thickness and a first diameter, wherein the first scatter kernel is not a monotonically decreasing function of radial coordinate, determination of a second scatter kernel based on the first energy, the material-equivalent radiological thickness and a second diameter greater than the first diameter, determination of a third scatter kernel based on the first scatter kernel and the second scatter kernel, wherein the third scatter kernel is a monotonically decreasing function of radial coordinate, and estimation of scatter radiation within the projection image of the object based on the third scatter kernel.

21 Claims, 11 Drawing Sheets

OTHER PUBLICATIONS

L. Alan Love et al., "Scatter estimation for a digital radiographic system using convolution filtering", Medical Physics, vol. 14, No. 2, Mar./Apr. 1987, © 1987 Am. Assoc. Phys. Med., pp. 178-185 (total 8pgs.).

Ruola Ning et al., "X-ray scatter correction algorithm for cone beam CT imaging", Medical Physics, vol. 31, No. 5, May 2004, © 2004 Am. Assoc. Phys. Med., pp. 1195-1202 (total 8pgs.).

Jonathan S. Maltz et al., "Focused beam-stop array for the measurement of scatter in megavoltage portal and cone beam CT imaging", Medical Physics, vol. 35, No. 6, Jun. 2008, © 2008 Am. Assoc. Phys. Med., pp. 1-12 (total 12pgs.), Proof Copy 038806MPH.

B. M. C. McCurdy et al., "A two-step algorithm for predicting portal dose images in arbitrary detectors", Medical Physics, vol. 27, No. 5, Sep. 2000, © 2000 Am. Assoc. Phys. Med., pp. 2109-2116 (total 8pgs.).

Oliver Morin et al., "Megavoltage Cone-Beam CT: System Description and Clinical Applications", Medical Dosimetry, vol. 31, No. 1, 2006, © 2006 American Association of Medical Dosimetrists, pp. 51-61 (total 11pgs.).

B. Ohnesorge et al., "Efficient object scatter correction algorithm for third and fourth generation CT scanners", European Radiology, No. 9, (1999) © Springer-Verlag 1999, pp. 563-569 (total 7pgs.).

B. Ohnesorge et al., "Effective correction for CT image artifacts caused by objects extending outside the scan field of view", Medical Physics, vol. 27, No. 1, Jan. 2000, © 2000 Am. Assoc. Phys. Med., pp. 39-46 (total 8pgs.).

J. H. Siewerdsen et al., "A simple, direct method for x-ray scatter estimation and correction in digital radiography and cone-beam CT", Medical Physics, vol. 33, No. 1, Jan. 2006, © 2006 Am. Assoc. Phys. Med., pp. 187-197 (total 11pgs.).

L. Spies et al., "correction of scatter in megavoltage cone-beam CT", Physics in Medicine and Biology, vol. 46, 2001, Institute of Physics Publishing, PII: S0031-9155(01)16832-6, © 2001 IOP Publishing Ltd., www.iog.org/Journals/pb, pp. 821-833 (total 13pgs.).

M. K. Yu et al., "Linear accelerator photon beam quality at off-axis points", Medical Physics, vol. 24, No. 2, Feb. 1997, © 1997 Am. Assoc. Phys. Med., pp. 233-239 (total 7pgs.).

Wojciech Zbijewski et al., "Efficient Monte Carlo Based Scatter Artifact Reduction in Cone-Beam Micro-CT", IEEE Transactions on Medical Imaging, vol. 25, No. 5, Jul. 2006, pp. 817-827 (total 11pgs.).

M. Zellerhoff et al., "Low contrast 3D-reconstruction from C-arm data", Siemens AG Medical Solutions, Forchheim, Germany, 11pgs. 2005.

S. A. Watson et al., "Design, Fabrication and Testing of a Large anti-Scatter Grid for Megavolt γ-Ray Imaging", 2005 IEEE Nuclear Science Symposium Conference Record, N14-148, pp. 717-721 (total 5pgs.).

* cited by examiner

SYSTEM TO ESTIMATE X-RAY SCATTER

BACKGROUND

1. Field

The embodiments described herein relate generally to radiation-based imaging. More particularly, the described embodiments relate to the estimation of scatter radiation within projection images.

2. Description

Radiation-based imaging systems are well-known. According to some examples, a radiation beam is emitted prior to treatment, passes through a volume of the patient and is received by an imaging system. The imaging system produces a set of data that represents the attenuative properties of objects of the patient volume that lie between the radiation source and the imaging system.

The set of data is used to generate a two-dimensional projection image of the patient volume. The projection image will include areas of different intensities that reflect different compositions of the objects. For example, areas of low radiation intensity may represent bone and areas of high radiation intensity may represent tissue. Several two-dimensional projection images may be acquired from different perspectives with respect to the patient volume and combined to generate a three-dimensional image of the patient volume.

The three-dimensional image, and "slices" thereof, may be used to diagnose disease, to guide surgical interventions, to plan radiation therapy, to confirm patient positioning prior to therapy, and/or to perform image-guided radiotherapy (IGRT). Advanced clinical applications such as dose-guided radiation therapy (DGRT) rely on images in which displayed Hounsfield numbers are accurately mapped to electron density to ensure the accuracy of calculated doses.

Conventional computed tomography (CT) reconstruction implicitly assumes that the imaging beam is monoenergetic, and, consequently, that the acquired projection data are related to the attenuation coefficients within the imaged object by a simple exponential model. Owing to the polyenergetic nature of Bremsstrahlung X-ray beams, the scattering of photons within the imaged object, and the dependence of detector response on incident photon energy, this assumption often leads to large inaccuracies. In addition, the intensity and energy spectrum of cone beam radiation sources typically varies over the imaging field. Accurate CT reconstruction may therefore depend on appropriate modeling of scatter, beam-hardening, beam profile, beam spectral variation and detector response.

Scatter radiation, for example, does not generally travel along an expected radiation trajectory from the radiation source to the imaging system. Scatter radiation received at a particular location of the imaging system therefore does not reflect attenuative properties of all the tissues located along an expected trajectory from the radiation source to the particular location. This leads to quantitative inaccuracies in reconstructed tomographic images. In medical X-ray imaging, these inaccuracies manifest themselves as dark shading or streak artifacts, where the density of the images object is underestimated owing to scatter and beam-hardening. In addition, received scatter radiation induces noise and reduces the intensity gradients (i.e., contrast) between image areas that represent different objects in a projection image. The reduced contrast may inhibit identification of structures within the projection image and any CT reconstruction based thereon, particularly with respect to soft tissue structures.

Many methods of scatter reduction and compensation have been proposed. Most methods are based on simplified models of scatter physics or assumptions relating to the smoothness of the scatter distribution in the projection images. Full Monte Carlo (MC) simulation methods are too time consuming, at present, for practical use in many clinical workflows and require an existing dataset describing the attenuation coefficient distribution within the object. To address these limitations, iterative schemes have been proposed whereby MC simulations are applied to a tomographic image reconstructed from scatter-contaminated projections, and subsequently to scatter-corrected iterates thereof. While such schemes require multiple MC runs, the application of variance reduction methods such as smoothing allows a low number of particle histories to be employed.

Beam-stop arrays can be used to measure scatter directly, but require the acquisition of two sets of projection images. Other beam-stop methods interpolate scatter between collimator shadows. These latter methods result in a reduction in field-of-view and performance that is strongly object-dependent. Antiscatter grids can physically attenuate scatter radiation by 5 to 10 times relative to primary radiation but lead to the loss of 25% to 33% of primary radiation and reduced flexibility with regard to detector positioning. Focused antiscatter grids (Potter-Bucky grids) can be employed for megavoltage (MV) X-ray and $^{60}$Co gamma ray imaging, but are bulky, heavy and costly. Scatter radiation may also be separated by physical frequency modulation and filtering of the scatter and primary radiation components, but this is difficult to achieve with polyenergetic beams.

The scatter kernel superposition (SKS) method of scatter modeling has been developed for application to MV imaging using a treatment linear accelerator (linac). To remove the contribution of scattered X-rays from a projection image, SKS methods assume: 1) the scatter distribution may be modeled as the sum of the scatter contributions of primary pencil beams that traverse the imaged object; 2) the scatter contribution of each primary pencil beam is dependent only on the material it traverses along its path; and 3) a primary image may be recovered from the measured (primary plus scatter) image via an iterative process of scatter removal.

The first two assumptions are most valid in homogeneous objects but are violated in the case of heterogeneous objects and/or long, thin objects. In heterogeneous objects, scattered particles may follow radiological paths through materials having properties that differ markedly from those traversed by the primary pencil beam. When long, thin objects are imaged (i.e., with the long axis parallel to the beam), SKS methods will calculate an equal contribution for two parallel pencil beams, one traversing the central axis of a cylinder and the other traversing the edge, even though scatter due to the beam at the edge experiences strongly anisotropic attenuation.

The effects of violating these assumptions are increased at low energies. A given anthropomorphic phantom will appear far less homogeneous to an incident beam at diagnostic (i.e., kV) energies owing to the far greater dependence of attenuation on the atomic number of the imaged material. Additionally, the increased attenuation experienced by a kV primary beam leads to higher scatter-to-primary ratios (SPRs). The higher SPRs increase errors due to the above-described problems with long thin objects, since differential attenuation of the scatter distribution attributable to the two central and edge-located pencil beams is larger. Moreover, as will be further described below, the wider scattering angles of low energy scattering events lead to wider scatter kernels and thus more extended propagation of estimation errors at object edges.

SUMMARY

In order to address the foregoing, some embodiments provide a system, method, apparatus, and means to determine a first scatter kernel based on a first energy, a material-equivalent radiological thickness and a first diameter, wherein the first scatter kernel is not a monotonically decreasing function of radial coordinate, to determine a second scatter kernel based on the first energy, the material-equivalent radiological thickness and a second diameter greater than the first diameter, to determine a third scatter kernel based on the first scatter kernel and the second scatter kernel, wherein the third scatter kernel is a monotonically decreasing function of radial coordinate, and to estimate scatter radiation within the projection image of the object based on the third scatter kernel.

In some aspects, determination of the third scatter kernel includes calculation of an integral of the first scatter kernel from a first finite radius to a second finite radius, calculation of an integral of the second scatter kernel, and scaling the second scatter kernel based on the integral of the first scatter kernel and the integral of the second scatter kernel. The second finite radius may be associated with a local minimum of the first scatter kernel. According to further aspects, calculation of the integral of the second scatter kernel comprises calculation of the integral of the second scatter kernel from $r=0$ to $r=\infty$.

Estimation of the scatter radiation may include determination of a maximum bound of scatter radiation, determination of determining an upper bound of a thickness of the object and a lower bound of intensity of an intensity of the projection image, and/or performance of multiplicative iteration to prevent negative estimates of primary radiation within the projection image.

The appended claims are not limited to the disclosed embodiments, however, as those in the art can readily adapt the descriptions herein to create other embodiments and applications.

BRIEF DESCRIPTION OF THE DRAWINGS

Embodiments will become readily apparent from consideration of the following specification as illustrated in the accompanying drawings, in which like reference numerals designate like parts, and wherein.

DETAILED DESCRIPTION

The following description is provided to enable a person in the art to make and use some embodiments and sets forth the best mode contemplated by the inventor for carrying out some embodiments. Various modifications, however, will remain readily apparent to those in the art.

Figure 1:
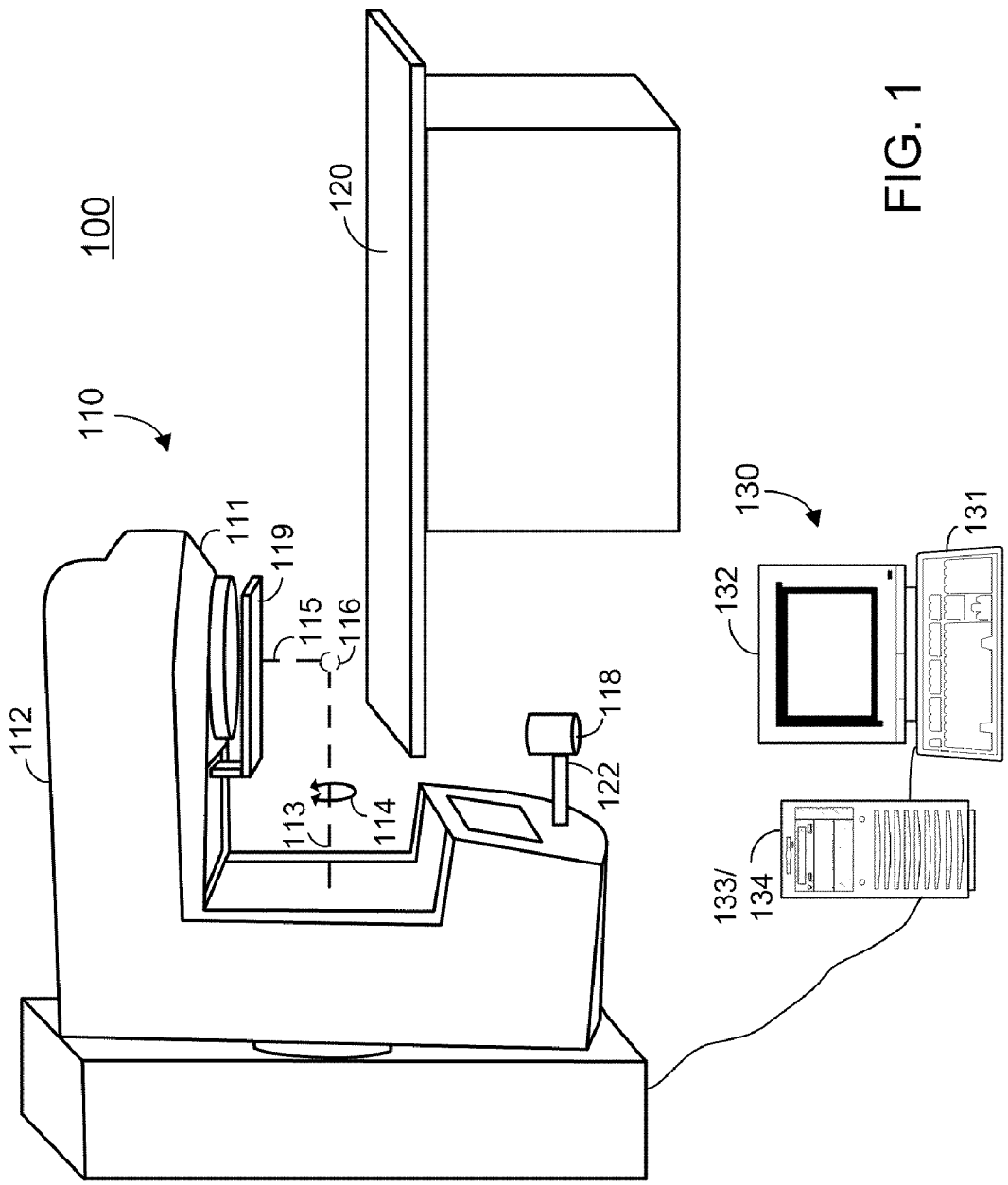
FIG. 1 is a perspective view of a linear accelerator system according to some embodiments.

FIG. 1 illustrates radiation treatment room 100 pursuant to some embodiments. Radiation treatment room 100 includes linear accelerator (linac) 110, table 120 and operator console 130. The elements of radiation treatment room 100 may be used to generate projection images of a target volume based on kV or MV X-rays, and to deliver a treatment beam of X-rays to a target volume. In this regard, a target volume may comprise a radiological phantom or a patient volume. The elements of treatment room 100 may be employed in other applications according to some embodiments.

Linac 110 may comprise an in-line kilovoltage/megavoltage radiotherapy delivery system such as the ARTISTE™ system from Siemens Medical Systems, but embodiments are not limited thereto. Linac 110 generates and emits a MV X-ray beam from treatment head 111. Treatment head 111 therefore includes a beam-emitting device for emitting a beam during calibration, verification, and/or treatment. The radiation beam may comprise electron, photon or any other type of radiation.

Also included within treatment head 111 is a beam-shielding device, or collimator, for shaping the beam and for shielding sensitive surfaces from the beam. The collimator may be rotated and various elements of the collimator may be positioned according to a treatment plan. The collimator may thereby control a cross-sectional shape of the beam.

Treatment head 111 is coupled to a projection of gantry 112. Gantry 112 is rotatable around gantry axis 113 before, during and after radiation treatment. As indicated by arrow 114, gantry 112 may rotate clockwise or counter-clockwise according to some embodiments. Rotation of gantry 112 serves to rotate treatment head 111 around axis 113.

During radiation treatment, treatment head 111 emits a divergent beam of megavoltage X-rays having beam axis 115. Isocenter 116 of linac 110 is located at the intersection of beam axis 115 and gantry axis 113.

Table 120 supports an object during calibration, verification, and/or radiation treatment. Table 120 may be adjustable to assist in positioning an object at isocenter 116 of linac 110. Table 120 may also be used to support devices used for such positioning, for calibration and/or for verification.

Imaging device 117 is retracted into an opening of gantry 112. Imaging device 117 may acquire projection images based on a beam emitted by treatment head 111 before, during and/or after radiation treatment. For example, imaging device 117 may be used to acquire images for verification and recordation of a target volume position and of an internal patient portal to which radiation is delivered.

Rotation of gantry 112 may cause treatment head 111 and imaging device 117 to rotate around isocenter 116 such that isocenter 116 remains located between treatment head 111 and imaging device 117 during the rotation. Imaging device 117 may comprise any system to acquire an image based on received X-rays.

Imaging X-ray source 118 is shown extended from gantry 112. Also shown is X-ray detector 119 which has been deployed from a cavity of gantry 112 to a position in front of treatment head 111. The configuration illustrated in FIG. 1 may be referred to as an imaging mode of linac 110. However, MV-based images may be acquired by deploying imaging device 117 and retracting X-ray detector 119.

Imaging X-ray source 118 is coupled to gantry 112 via extension 122. Imaging X-ray source 118 may comprise any suitable single or multi-source device to emit imaging radiation, including but not limited to a conventional X-ray tube. In some embodiments, X-ray source 118 emits kilovoltage radiation having energies ranging from 50 to 150 keV.

X-ray detector 119 may comprise a flat-panel imaging device using a scintillator layer and solid-state amorphous silicon photodiodes deployed in a two-dimensional array. In operation, the scintillator layer receives photons and generates light in proportion to the intensity of the received photons. The array of photodiodes receives the light and records the intensity of received light as stored electrical charge. The stored charge therefore comprises an acquired image that represents intensities at each location of a radiation field produced by a radiation beam. The bounds of the radiation field are determined by the physical intersection of the radiation beam with the surface of the scintillator layer.

X-ray detector 119 may comprise other types of imaging devices. For example, X-ray radiation may also be converted to and stored as electrical charge without use of a scintillator layer. In such imaging devices, X-rays are absorbed directly by an array of amorphous selenium photoconductors. The photoconductors convert the X-rays directly to stored electrical charge that comprises an acquired image of a radiation field.

The charge developed and stored by X-ray detector 119 represents radiation intensities at each location of a radiation field produced by a beam emitted from imaging X-ray source 118. The radiation intensity at a particular location represents the attenuative properties of material along a divergent line between source 118 and the particular location. The set of radiation intensities acquired by X-ray detector 119 may therefore comprise a two-dimensional projection image of this material.

Such a projection image, taken alone, is of limited use in determining a position of a particular internal target. Specifically, the target will likely be obscured by structures located between the target and X-ray source 118 and by structures located between the target and X-ray detector 119. Some conventional systems attempt to determine a position of a target by generating a three-dimensional cone beam CT image prior to treatment. Generation of a cone beam CT image requires acquisition of many projection images from many perspectives along a $\geq 180$ degree arc surrounding the target.

Operator console 130 includes input device 131 for receiving instructions from an operator and output device 132, which may be a monitor for presenting operational parameters of linac 110, images acquired by imaging device 117, images acquired by X-ray detector 119, CT images used for treatment planning, interfaces for receiving operator instructions, and/or operator alerts. According to some embodiments, output device 132 may present an alert notifying an operator of an error during treatment delivery.

Input device 131 and output device 132 are coupled to processor 133 and storage 134. Processor 133 may execute program code to perform any of the determinations, calculations, iterations and estimations described herein. The program code may be stored in storage 134, which may comprise one or more storage media of identical or different types, including but not limited to a fixed disk, a floppy disk, a CD-ROM, a DVD-ROM, a Zip™ disk, a magnetic tape, and a signal.

Storage 134 may also store program code to generate and/or modify a treatment plan according to some embodiments. Accordingly, storage 134 may also store radiation treatment plans in accordance with any currently- or hereafter-known format. The treatment plans may comprise scripts that are automatically executable by elements of room 100 to provide treatment fractions. Each beam of each fraction of each treatment plan may require treatment head 111 to be positioned in a particular manner with respect to a patient, a collimator to be configured to define a particular beam shape, and a MV X-ray source to deliver a beam having a particular energy profile.

Storage 134 may also store datasets used for image correction, scatter correction, and/or calibration. As will be described below, storage 134 may store pixel intensity-to-material-equivalent-thickness (MET) maps to estimate radiological thicknesses of imaged material. Also stored may be scatter kernels describing two-dimensional SPRs under given conditions. The maps and scatter kernels may be used to estimate scatter within acquired projection images according to some embodiments. The maps and/or kernels may be determined by processor 133 based on linac 110 or determined elsewhere and stored in storage 134 thereafter.

In addition to the MET maps and scatter kernels, storage 134 may store tables containing information used to determine upper bounds on scatter distributions and SPRs based on one or more of the following quantities: beam energy, radiation field-size, object apparent thickness, object true thickness, object diameter and position of the object within the imaging field. Such information may be stored in lookup tables.

Operator console 130 may be in a room other than treatment room 100, in order to protect its operator from radiation. For example, treatment room 100 may be heavily shielded, such as a concrete vault, to shield the operator from radiation generated by linac 110.

A hardware environment according to some embodiments may include less or more elements than those shown in FIG. 1. In addition, embodiments are not limited to the devices and/or to the illustrated environment.

Figure 2:
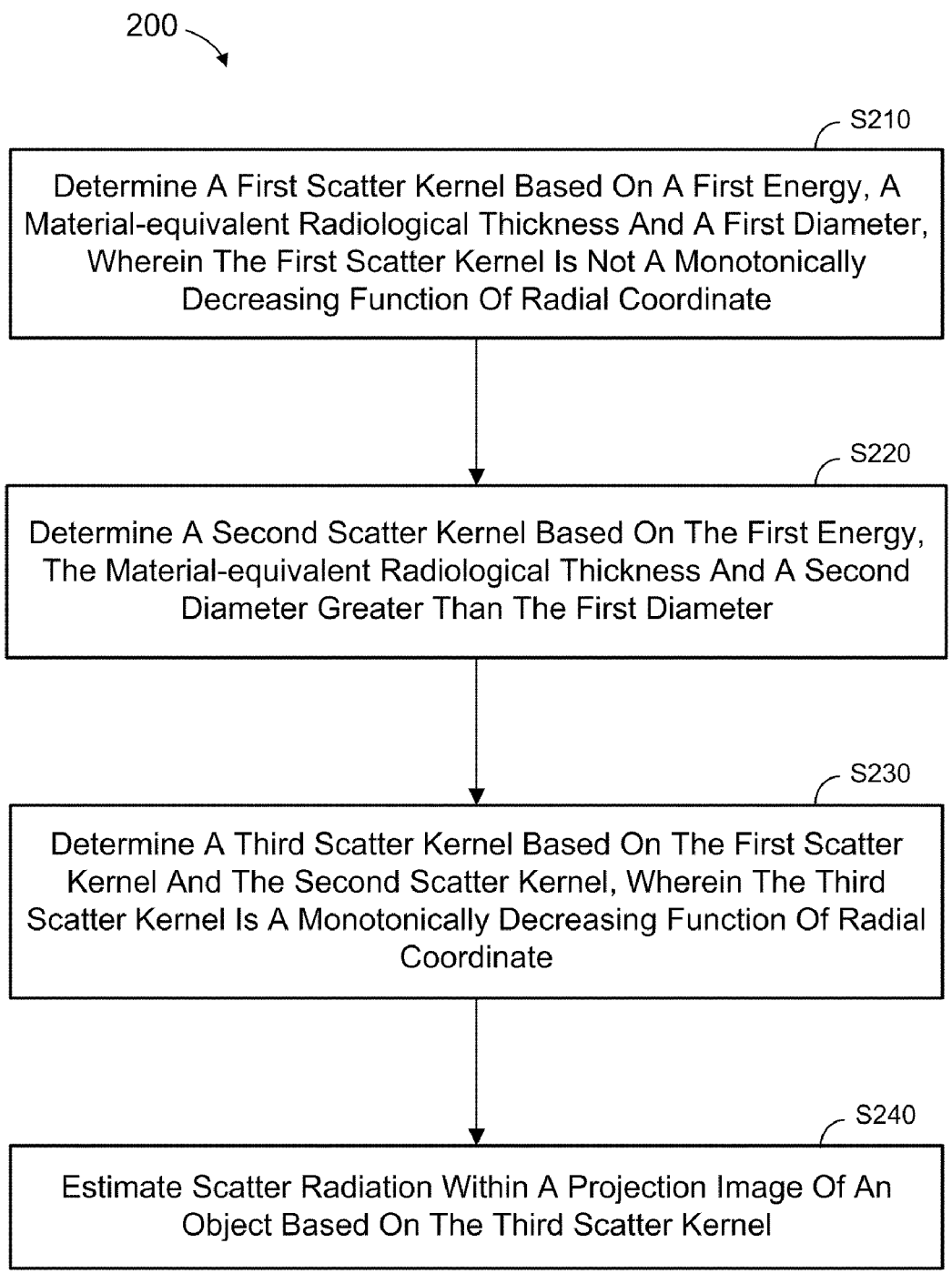
FIG. 2 is a flow diagram of a process according to some embodiments.

FIG. 2 is a flow diagram of process 200 according to some embodiments. Process 200 and all other processes described herein may be executed by one or more components of linac 110, operator console 130 and other systems. Accordingly, these processes may be embodied in hardware and/or software and, although described herein with respect to specific systems, may be implemented and executed differently than as described.

Some embodiments of process 200 provide scatter kernels for estimation of scatter distribution at kV energies when SPRs are high. Initially, a first scatter kernel is determined based on a first energy, a material-equivalent radiological thickness and a first diameter. The determined first scatter kernel is not necessarily a monotonically decreasing function of radial coordinate.

Figure 3:
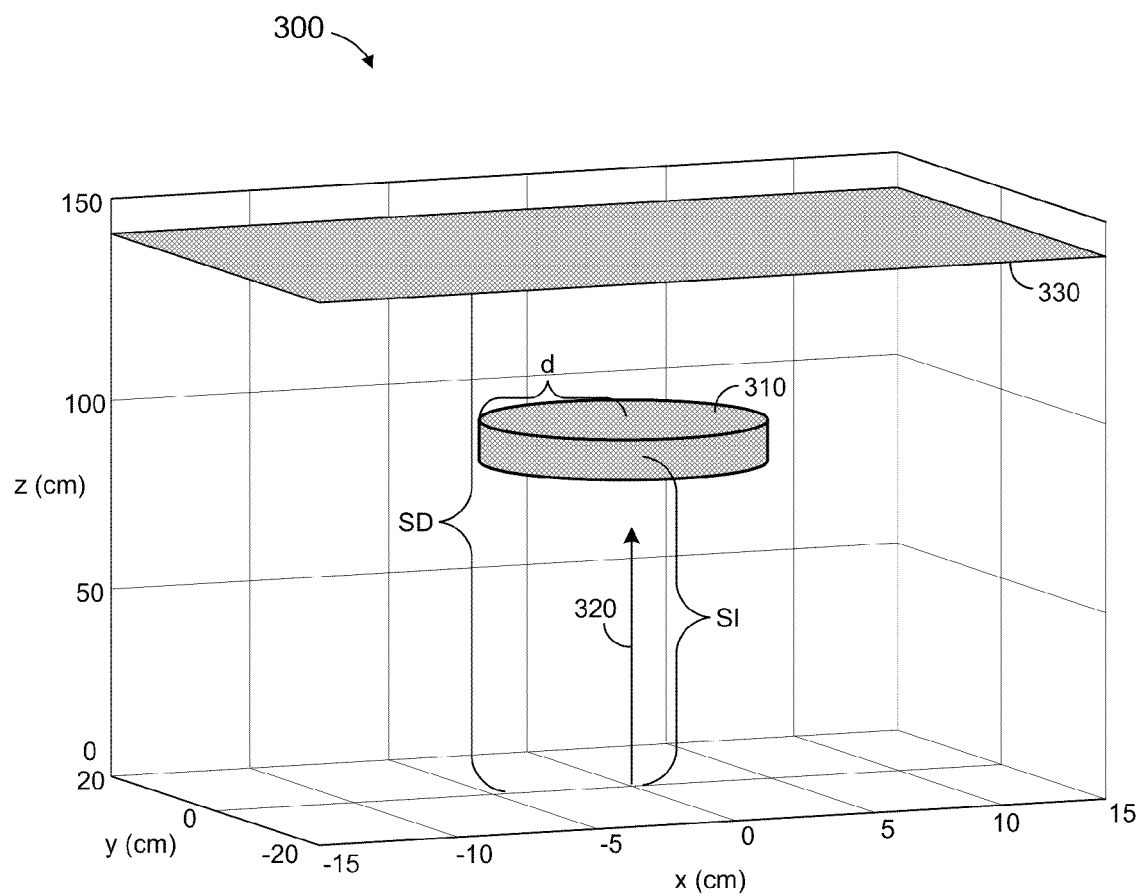
FIG. 3 illustrates a Monte Carlo simulation geometry according to some embodiments.

FIG. 3 shows an MC simulation geometry 300 for the generation of a scatter kernel according to some embodiments of S210. A cylinder 310 of water of diameter d is centered at an isocenter. Polyenergetic pencil beam 320 traverses the central axis of cylinder 310. Pencil beam 320 has a spectrum equal to the mean of the spectrum of an expected cone beam over the area of a detector. MC simulations are performed and the resulting phase space output is recorded at scoring plane 330. When a device such as an antiscatter grid is present, the phase space data are processed analytically as described at the end of the present document. The phase space output is then folded through the response function of the detector to produce a two-dimensional distribution, or scatter kernel.

Figure 4:
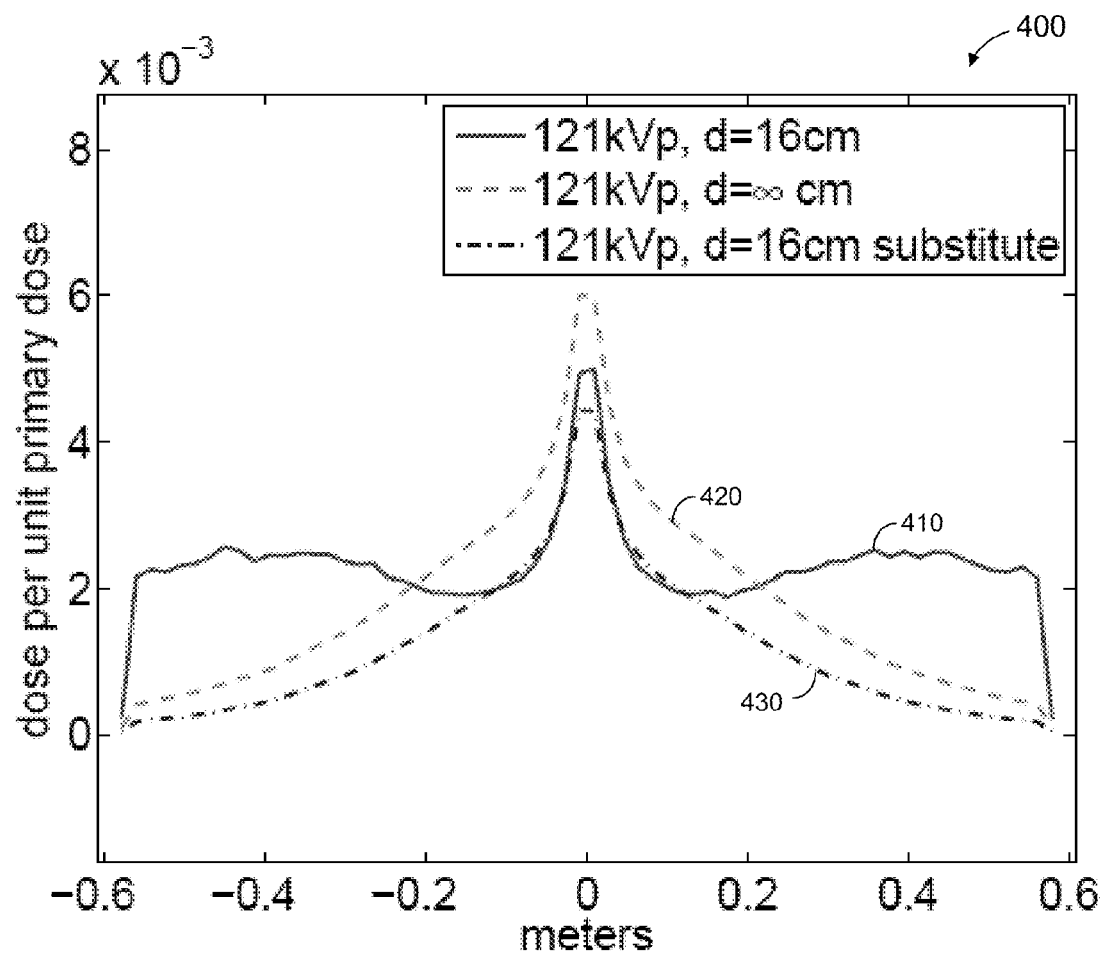
FIG. 4 is a comparison of radial profiles of scatter kernels determined according to some embodiments.

Graph 400 of FIG. 4 illustrates first scatter kernel 410 according to some embodiments. First scatter kernel 410 was determined based on a 121 kV energy and a 16 cm diameter cylinder. Scatter kernel 410 is expressed as scatter radiation dose per unit of primary radiation dose as a function of radial coordinate.

First scatter kernel 410 is not a monotonically decreasing function of the radial coordinate. Rather, scatter kernel 410 increases outside the radius of the cylinder due to scatter that originates from the vertical sides of the cylinder. If such a kernel were used according to conventional SKS methods to estimate scatter caused by a beam impinging near an edge of an object, the kernel would contribute large amounts of scatter in the area of the detector directly under the object. In reality, this scatter radiation would be heavily attenuated by the object itself and would not reach the detector unattenuated. Some embodiments of process 200 therefore attempt to remove from the first kernel the contribution of photons that originate from the vertical sides of the cylinder.

For example, a second scatter kernel is determined at S220 based on the first energy and the MET used at S210, and on a second object diameter greater than the first object diameter. According to some embodiments, the second object diameter is ∞, but could be a smaller value that allows the full integral described below to be suitably approximated. Graph 400 shows second scatter kernel 420 determined according to some embodiments.

A third scatter kernel is determined at S230 based on the first scatter kernel and the second scatter kernel. The third scatter kernel is a monotonically decreasing function of radial coordinate. Continuing with the present example, third scatter kernel 430 of graph 400 may be determined at S230 according to some embodiments.

In some embodiments of S230, second scatter kernel is scaled based on the first scatter kernel to determine the third scatter kernel. According to some of these embodiments, the radius R at which the first kernel begins to increase with radial distance is determined. Next, the following integral is calculated with respect to the first scatter kernel:

$A_d = \int_0^R \sigma_t^d(r) dr$, where d=16 cm and $\sigma_t^d$ is the two-dimensional radially-symmetric scatter kernel derived from a cylinder of radius d and thickness t. Here, we express this kernel in radial coordinates.

An integral is then calculated with respect to the second scatter kernel as follows:

$A_\infty = \int_0^R \sigma_t^\infty(r) dr$.

The third scatter kernel is then determined at S230 to be $(A_d/A_\infty)\sigma_t^\infty(r)$. Using such a third scatter kernel instead of the first scatter kernel may more closely preserve the SPR due to the central monotonically decreasing lobe of $\sigma_t^d(r)$, which would be overestimated by $\sigma_t^\infty(r)$.

Scatter radiation within a projection image of an object may be estimated at S240 based on the determined third scatter kernel. A MET thickness of the object, a diameter of the object, and an energy of a beam used to acquire the projection image may correspond to the MET thickness, diameter and energy used to determine the first scatter kernel at S210. Any currently or hereafter-known SKS method may be employed at S240, including but not limited to those described below.

Estimation of the scatter radiation according to some embodiments of process 200 includes scaling the scatter kernels by the true intensity of the beam, rather than by the intensity directly reported by the imaging detector. Most contemporary detectors are calibrated to report equal values at each pixel when impinged upon by an unobscured imaging beam, but since most practical X-ray cone beams exhibit a spatially-varying intensity and spectrum, the detected image under such a calibration regime is not representative of a quantity proportional to the true dose imparted to the sensitive elements of the detector. Accordingly, and in contrast to previous embodiments of SKS algorithms, some embodiments take into account spatially-varying beam characteristics.

Figure 5:
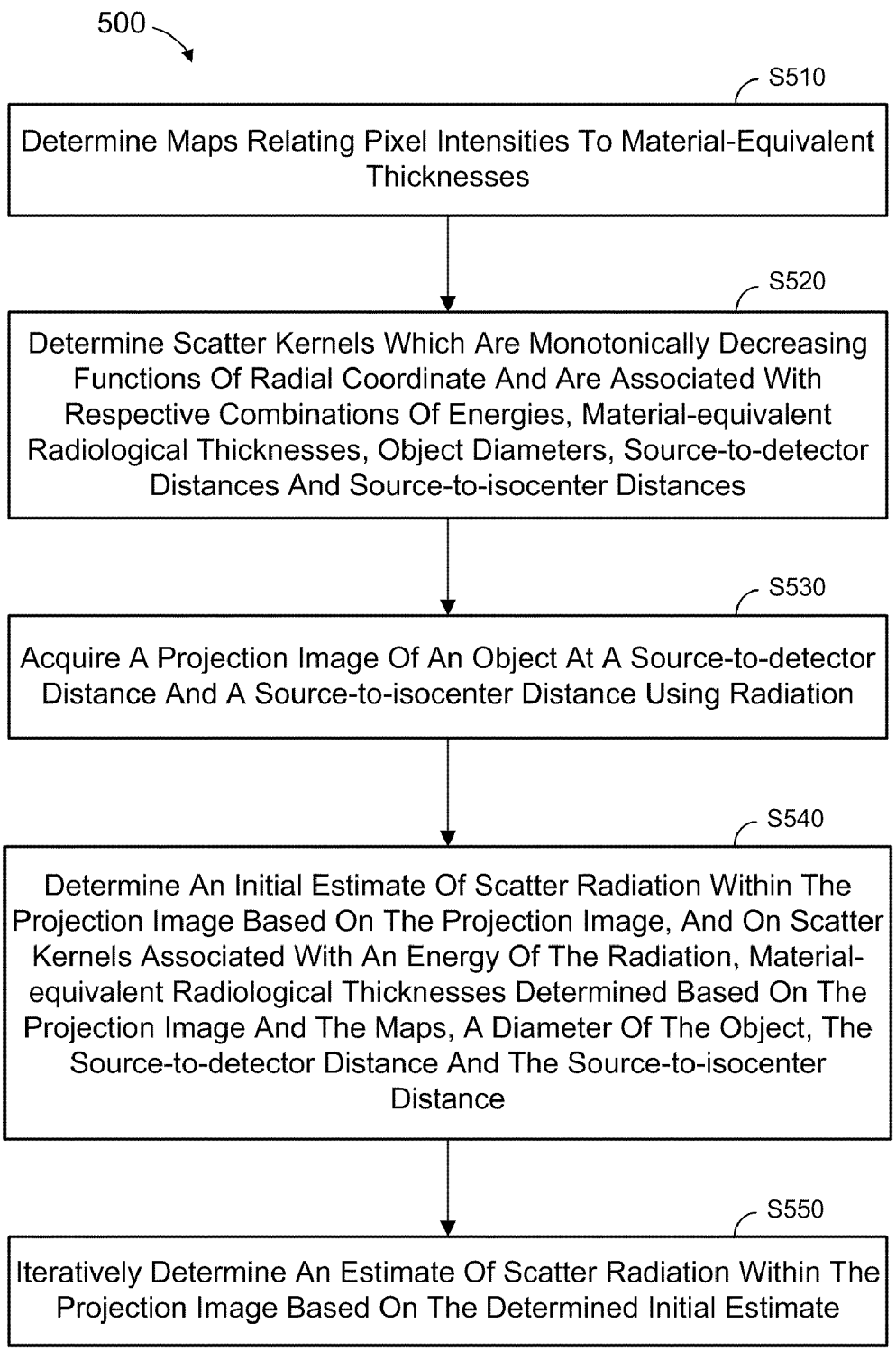
FIG. 5 is a flow diagram of a process according to some embodiments.

FIG. 5 is a detailed flow diagram of process 500 to estimate scatter radiation according to some embodiments. Process 500 may include process 200, although specific implementations may differ from those described with respect to FIG. 2. Although process 500 refers to a kV radiation source, process 500 may alternately be performed in conjunction with a MV radiation source.

Process 500 begins by determining maps at S510. For a given beam, detector and imaging geometry, each map associates METs with detected pixel intensities. In some embodiments, projection images of materials having known METs are acquired and used to build the intensity-to-MET maps. Embodiments described below utilize MC simulations to derive such maps.

The inputs and outputs of the MC simulations that produce the scatter kernels and thickness map data are expressed in terms of a general model of an imaging beam. The imaging beam may be modeled as spatially variant in intensity and spectral content. Within the imaging beam, each of the N simulated particles is completely described by the set:

$s_n = \{E_n, x_n, y_n, \alpha_n, \beta_n, q_n, 1_n\}$, n=1, ..., N, where E is the particle energy, (x, y) is the position of the photon within the source plane, α and β are the respective x and y direction cosines, q represents the particle charge (0 for photon, −1 for electron and 1 for positron) and/indicates whether the particle is a primary or scattered particle. The z-direction cosine is obtained as $\gamma = \sqrt{1-\alpha^2-\beta^2}$.

An X-ray projection image is formed by the action of the beam fluence on a flat detector that lies perpendicular to a central ray of the cone-shaped beam. Therefore, a model of a flat panel detector (specifically those fabricated on an a-Si:H substrate) considers the dark current that flows in the absence of applied radiation, and spatial variations in pixel sensitivity (i.e., gain) due to inhomogeneities in detector composition and readout circuit fabrication. Dark current correction values may be obtained by measuring panel output when no radiation is applied. Gain correction values may be obtained by illuminating the detector with a uniform flood-field. However, inhomogeneities in beam intensity and spectrum complicate the compensation for unequal pixel gains.

For example, images may be acquired on a flat panel detector that lies in the (u, v) plane. Let the detector sample an array of M×N pixels, indexed along the u and v-axes by m and n, respectively. Let $F_m[m,n]$ represent the measured flood-field image and $F_i[m,n]$ the flood-field image that would be obtained for uniform illumination. The latter (i.e., $F_i[m,n]$) is equal to the intrinsic gain of the pixels of the detector.

$F_m[m,n] = F_b[m,n] \times F_i[m,n]$, where $F_b[m,n]$ represents the image of the beam that would be obtained by a detector of uniform gain. The ideal gain correction image $G[m,n]=1/F_i[m,n]$ can be found only when $F_b[m,n]$ is known. Measurement of $F_b[m,n]$ would require a detector having uniform sensitivity and identical spectral response to the detector being calibrated. Calculation via MC simulation is possible, but the MC simulation would need to be performed for each unique beam.

In some cases, it is possible to design a physical compensator device (e.g., a 10 cm slab of water-equivalent material) to flatten the beam profile. For example, the photon treatment beams of conventional medical linacs are designed in such a way that the distribution (in the plane perpendicular to the beam central axis) of delivered dose becomes flatter as the beam traverses the first few centimeters within the patient. As a consequence, the beam better approximates a uniform source. Although requiring an additional piece of calibration hardware, the gain calibration is conducted using a beam having an energy spectrum that is very similar to that which exists the patient during imaging. As a result, errors in the gain correction factors due to the dependence of pixel gain (i.e., electronic) on the energy spectrum of the beam are reduced.

Since practical sources of X-ray illumination are not uniform (e.g., due to the anode heel effect, the inherent non-uniformity of Bremsstralhung-derived X-ray beams, or beamline elements such as flattening filters or bow-tie filters), the detector may be normalized to the beam profile rather than to an ideal uniform illumination source. Beam profiles are almost invariably smooth, slowly-varying functions, so $F_i$ can be extracted from $F_m$ by low pass filtering or by fitting a smooth function to $F_m$ that approximates $F_b$. The latter is then subtracted from $F_m$ to yield an estimate of $F_i$. A more general alternative is to use MC methods and a model of the X-ray detector to calculate an image of the beam profile.

Some embodiments remove a beam profile of circularly-symmetric beams (such as those of treatment linacs) from the gain correction image. First, the inverse of $F_b[m,n]$ is estimated by calculating the mean radial profile of $1/F_m[m,n]$. A cubic B-spline is fit to this profile and a 2D radially symmetric image $G_r[m,n]$ exhibiting the fitted radial profile is constructed. Let $I_m[m,n]$ represent a measured projection image that has been corrected for detector offset. Gain correction is then effected as:

$$I[m,n]=I_m[m,n] \times G_m[m,n]/G_r[m,n] \approx I_m[m,n] \times G[m,n],$$
where $G_m[m,n]=1/F_m[m,n]$.

Any MV projection images used in conjunction with some embodiments may be processed as described above before application of a scatter and beam-hardening correction algorithm. With respect to images obtained using kV radiation, the aforementioned "heel effect" due to spatially-variant beam-hardening at the slanted anode may be ignored in most cases in medical imaging applications. When desired, compensation for the heel effect is performed by first correcting the projection image for inverse square law (ISQ) drop-off in beam intensity.

More particularly, a case is considered where the principal axis of beam variation due to the heel effect occurs along the u axis of the detector. Once ISQ compensation is effected, the image is averaged along the v axis to yield an average horizontal profile. A cubic B-spline of four or other small number of knots is fitted to this average profile. An image of M rows, each equal to this fitted profile is constructed to form an image $G_r[m,n]$ representing an approximation of the inverse of the detected beam profile. "Detected beam profile" refers to the beam profile as represented as a quantity proportional to the dose to the sensitive volumes of the detector due to the beam.

Other factors affecting beam profile, such as inverse square law drop-off in intensity and variable X-ray path length through filtration elements within the beamlines, may be explicitly accounted for in the beam models used to generate the calibration datasets.

Accordingly, continuing with the example of S510, each intensity value in an acquired image is mapped to a thickness of water that would produce the observed attenuation of the primary beam. As mentioned above, these maps were previously generated by propagating (as primary radiation) the source X-ray beam through digital phantoms representing water slabs of various thicknesses. Alternatively, the maps are derived from physical measurements consisting of images produced by propagating the actual beam through water slab phantoms. These measured data contain scatter radiation which must be estimated and subtracted before the dataset can be used to determine the properties of the primary beam.

In some embodiments, an MC simulation of the source is performed to derive a phase space representation of the beam (i.e., an "input phase space file"). Based on the position and trajectory of a particle in the input phase space file, a path length through the water slab phantom is calculated, and each particle is attenuated according to its path length and an attenuation coefficient for particles of its type and energy. An output phase space file records the positions, energies and directions of each particle that exits the phantom. Each particle is assigned a weight (which is also stored in the file) equal to its transmission factor. Conventionally, all exiting particles are recorded as they cross a "scoring plane" parallel to the detector. The scoring plane may coincide with the sensitive plane of the detector, however it is possible to translate a scoring plane along the z-axis to an arbitrary detector position using a projective transformation of particle co-ordinates. The foregoing approach may be referred to as "MC source—analytical primary propagation".

For validation purposes, it is often desirable to perform a full MC simulation of beam propagation through the water slab phantoms. This allows comparison of MC-derived images due to both primary and scatter fluence with physical measurements. This approach may be termed "MC source—MC primary and scatter propagation".

Figure 6:
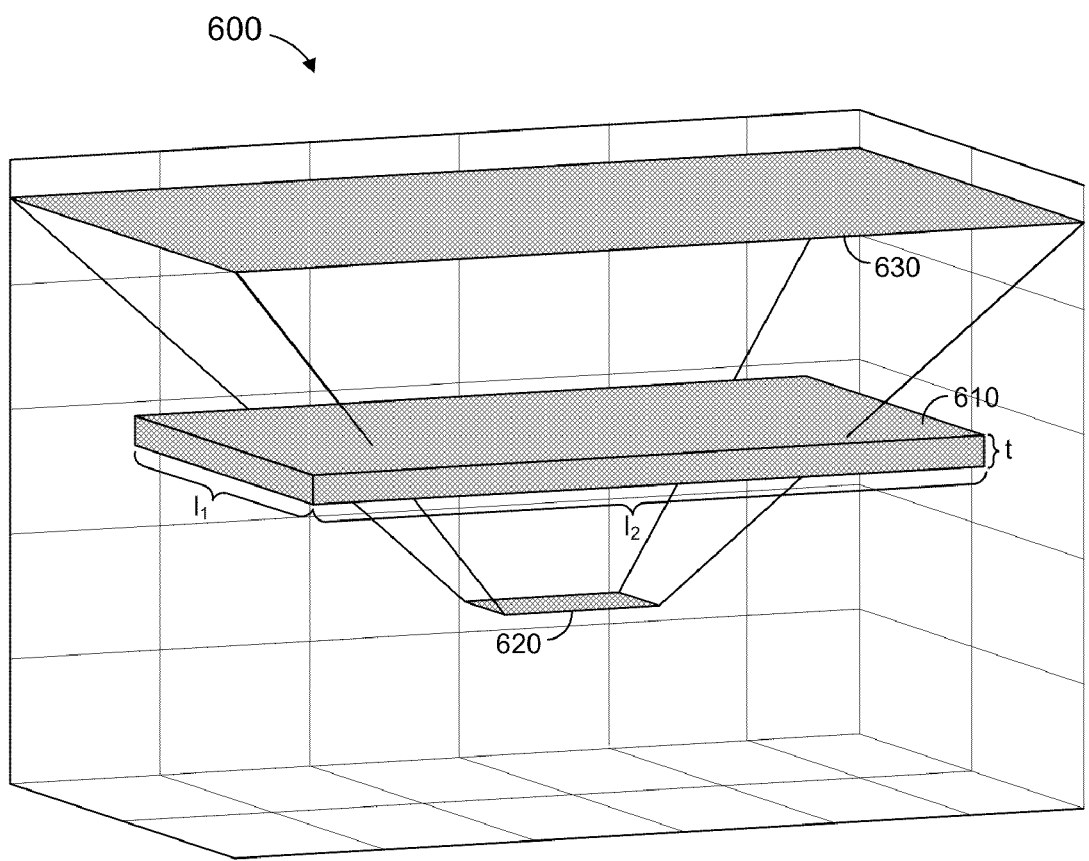
FIG. 6 illustrates a simulation geometry for generating material-equivalent thickness maps (using Monte Carlo or analytical methods) according to some embodiments.

FIG. 6 shows calibration simulation geometry 600 according to some embodiments of S510. Water slab 610 of dimension $l_1 \times l_2 \times t$ cm is centered at the imaging system isocenter. The lateral dimensions $l_1$ and $l_2$ are chosen so that the slab area is greater than the maximum cross-section of the beam. It may be convenient to select dimensions equal to the dimensions of available water-equivalent slabs, so that the MC simulations can be compared to physical measurements for validation purposes (using the "MC source—MC primary and scatter propagation" approach). The thickness t is varied from 0 to the maximum anticipated water-equivalent thickness of an imaged object ($l_{max}$).

Input phase space dataset 620 is propagated through water slab 610 to detector plane 630. The phase space at detector plane 630 is converted into an image of dose to the sensitive volume of the detector by folding the primary photons at detector plane 630 through the detector response function. The latter may estimated using a separate MC simulation (e.g., using EGSnrc user code DOSXYZnrc to simulate the dose to the sensitive volume of the detector due to monoenergetic beams of different energy. The determined dose due to each photon is added to the nearest pixel of the dose image. This produces a calibration dataset indexed by t which may be denoted as $W_{mn}(t)$. $t \in T$, where T is the set of all values of t for which calibration data are generated.

A continuous mapping from beam transmission to water-equivalent thickness facilitates the conversion of subsequently-acquired projection images into water-equivalent thickness maps. Treating each pixel of $W_{mn}(t)$ as a function of t, a model with demonstrated accuracy in modeling polychromatic X-ray beams may be fit over a wide energy range:

$$W_{mn}(t) = W_{mn}(0)^{-\frac{a_{mn}t}{1+b_{mn}t}}$$

This model has the advantage over the previously-employed linear-quadratic model in that it is better behaved when extrapolating to greater depths than those covered by the WET dataset to which it is fit. This is because the model is monotonically decreasing if $a \geq 0$ and $b \geq 0$ is asserted. The model is also computationally cheaper to solve for t than the linear-quadratic model.

In order to convert an acquired image I[m,n] to a WET map, given a flood-field image $I^0$[m,n], the thicknesses T[m,n] is determined such that:

$$\frac{W_{mn}(t)}{W_{mn}(0)} = \frac{I[m,n]}{I^0[m,n]}.$$

By solving the equation above, it is determined that thickness t at pixel [m,n] for which the MC-derived model produces a primary transmission $W_{mn}(t)/W_{mn}(0)$ equal to the observed transmission $I[m,n]/I^0[m,n]$. The entire water-equivalent calibration set (i.e., mapping) may thus be completely encapsulated in two M×N matrices A and B containing the $a_{mn}$ and $b_{mn}$ respectively.

The above approach to beam modeling is consistent with the gain correction scheme described above in that the profile of the incident beam is explicit in $W_{mn}(t)$. $I^0$[m,n] and I[m,n].

Returning to process 500, a database of scatter kernels is determined at S520. Each scatter kernel is a monotonically decreasing function of radial coordinate. Each scatter kernel is associated with a respective combination of photon energy, MET, object diameter, source-to-detector distance and source-to-isocenter distance. In some embodiments, each scatter kernel determined in S520 is determined as described with respect to the third scatter kernel of process 200. The chosen object diameters d may depend on the approximate gross dimension of an object to be imaged. For example, kernels may be determined with respect to an 18 cm diameter cylinder for application to images of the head, and with respect to a 34 cm diameter cylinder for larger anatomical regions such as the pelvis. The kernels may be generated for very few unique values of t and d and then interpolated and/or extrapolated to a larger number of values of t and d, respectively.

In comparison to anatomical atlas-based methods where complete scatter distributions are generated for anatomies of various shapes and sizes, a scatter kernel database according to some embodiments is more general in that no assumption is made of specific anatomy other than the value d. Scatter kernels may be less sensitive to changes in d than to changes in t. It is therefore possible to generate only two or three kernel sets for different values of d. In contrast, object thickness and width are coupled by the underlying anatomical model in atlas-based methods. The latter may be less flexible in modeling patient-to-patient differences in geometry and may require large image-scenario-specific databases.

Owing to the smooth nature of typical scatter distributions, the pixel size used for the discrete 2D scatter kernels may be larger than that of the original image. For example, good quality scatter estimates have been obtained using $M_l = N_l = 32$ pixels over a 40.96 cm×40.96 cm detector array. The subscript l denotes a downsampled image or kernel. For a given beam spectrum, source-to-isocenter distance, and source-to-detector distance, the database may be denoted as $\Sigma_l[m,n,l,d]$. Kernels may be generated as $(2M_l-1) \times 2N_l-1)$ matrices having the same pixel width as the downsampled image. Such an arrangement may ensure that the kernels overlap completely with the image throughout the superposition process.

Each kernel is normalized to the integral of the primary transmitted dose due to the pencil beam traversing the cylinder of appropriate thickness. When the scatter at each pixel is determined from the simulated dose distribution, the integral of the scatter is preserved. Consequently, the dimensionless kernels represent 2D SPRs.

The pencil beam uses a mean spectrum to represent the primary beam. Implicit in this use of the mean spectrum is the assumption that the scatter kernels are not significantly affected by spatial variation in the beam spectrum. It may therefore be possible, but time consuming, to generate different kernel sets for application at different positions in the detector plane. An example of the application of position-dependent kernel sets is provided below in context of the treatment of antiscatter grids.

Figure 7:
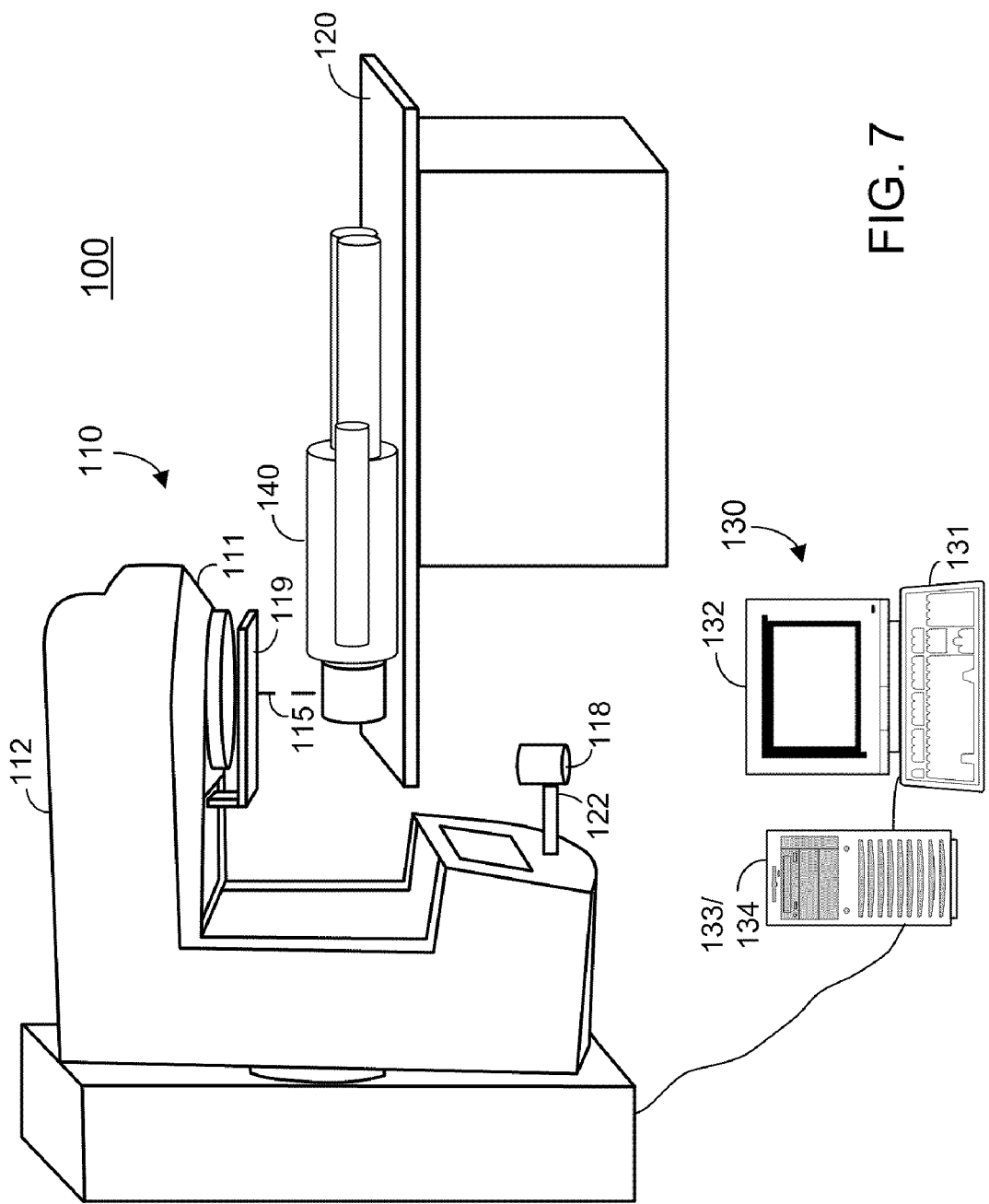
FIG. 7 is a perspective view of a linear accelerator system according to some embodiments.

S530 is performed after determination of the MET maps in S510 and determination of the scatter kernel database at S520. S510 and S520 may comprise a "calibration" phase that may be performed in a computing environment located remotely from any imaging or treatment radiation sources. In contrast, S530 may be performed in a treatment and/or imaging room with an object of interest positioned between a beam source and a detector. FIG. 7 illustrates treatment room 100 as described with respect to FIG. 1 but with object 140 disposed between kV X-ray source 118 and detector 119.

A projection image of an object is acquired at S530. The projection image is acquired by delivering kilovoltage radiation of a particular energy from X-ray source 118 and acquiring resulting pixel intensity information from detector 119. The geometry of the image acquisition reflects a particular source-to-detector distance and a particular source-to-isocenter distance.

Next, at S540, an initial estimate of scatter radiation within the projection image is determined. The determination is based on the projection image itself and on one or more of the database of scatter kernels. The scatter kernels used in the determination are associated with the particular energy of the kilovoltage radiation, the particular source-to-detector distance, and the particular source-to-isocenter distance used to acquire the projection image. The scatter kernels are also associated with the diameter of the object and with a MET of the object. The energy, distances and diameter are known, but the MET may be determined from the projection image and the MET maps determined at S510.

Given a specific MET map (e.g., a water equivalent thickness (WET) map) $T_l[m,n]$, acquired projection (intensity) image $I_l[m,n]$ and database $\Sigma_l[m,n,l,d]$ of kernels corresponding to a particular energy, source-to-detector distance, and particular source-to-isocenter distance, the initial estimate of scatter radiation may be determined at S540 as:

$S_l[m,n] = \sum_{j=1}^{J} \sum_{k=1}^{K} \Sigma_l[j-m, k-n, T_l[j,k], d] I_l[j,k]$, where J=M and K=N for the full kernel overlap case.

The scatter estimate is directly affected via the factor $I_l$, which is derived from an acquired image that has been corrected to reflect actual dose delivered to the detector. This is consistent with the above-described generation of the scatter kernels $\Sigma_l$ under the assumption of uniform detector gain. In an equivalent detector-centric (as opposed to beam-centric)

implementation, standard flood-field gain correction would be performed on all acquired images $I_m[m,n]$, and then the scatter estimate in the above equation would be multiplied by the beam-profile-corrected gain correction image (i.e., $G_m[m,n]/G_r[m,n]$).

An estimate of the scatter radiation within the projection image is iteratively determined at S530 based on the determined initial estimate. In this regard, and owing to scatter and beam-hardening in the projection image, $T_l[m,n]$ in the above equation does not actually reflect true radiological thickness. It may therefore be desirable to iterate the equation one or more times to correct for the error in $T_l[m,n]$.

Let $I_l^i[m,n]$ and $S_l^i[m,n]$ represent the downsampled intensity image and scatter radiation image after iteration (i–1). When image SPRs are low, it may be feasible to employ the known iteration:

$$I_l^i[m,n] = I_l^{i-1}[m,n] - S_l^{i-1}[m,n].$$

However, $I_l^i[m,n]$ may become negative if scatter is overestimated at any iteration. Three complementary strategies are proposed to address this issue. First, the iteration(s) may be constrained by a determined maximum bound of scatter radiation. Also or alternatively, the iteration(s) may be initialized using a determined upper bound of a thickness of the object and a determined lower bound of an intensity of the projection image. Finally, multiplicative iterations may be performed in a manner to prevent negative estimates of primary radiation within the projection image.

Figure 8A:
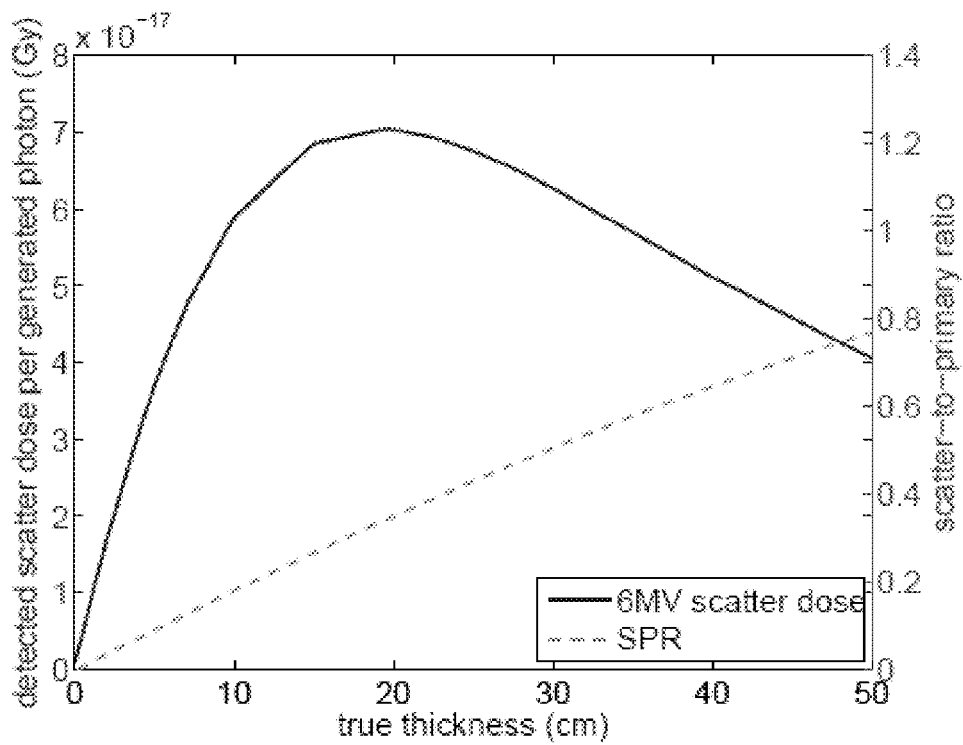
FIGS. 8A and 8B are graphs depicting detected dose due to scatter per photon for X-ray cone beams traversing water slabs of varying thicknesses.
Figure 8B:
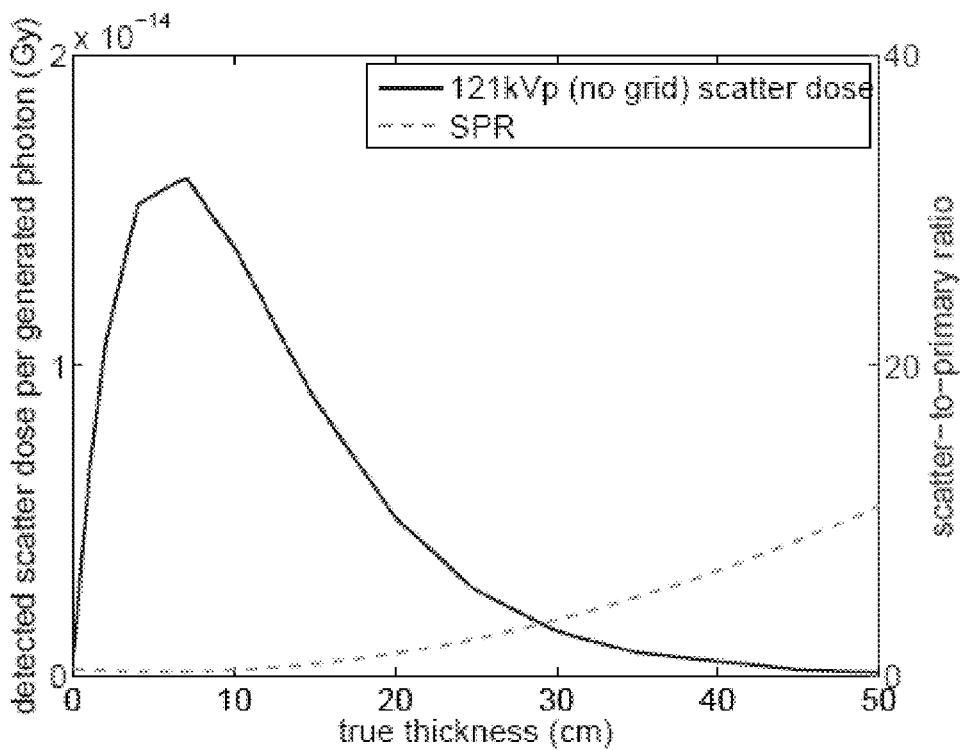

A reasonable bound may be placed on the absolute magnitude of the scatter distribution without detailed prior knowledge of the object shape using a water slab model. FIGS. 8A and 8B depict detected dose due to scatter per generated photon for X-ray cone beams traversing 30 cm×30 cm water slabs. FIG. 8A represents a 6MV cone beam, with SI=100 cm and SD=145 cm. FIG. 8B represents a 121 kV cone beam, with SI=100 cm and SD=142 cm. Based on the depicted behavior of scatter magnitude as a function of slab thickness, it may be assumed, for a particular beam energy and field-size, that this function has a single maximum at a certain thickness $t_c$.

Figure 9:
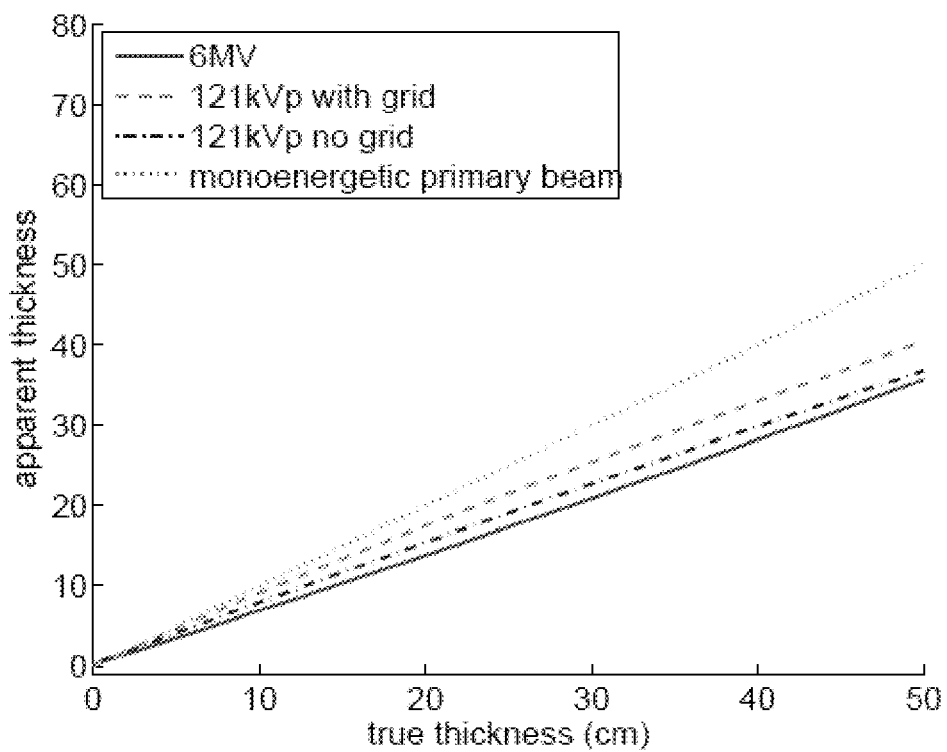
FIG. 9 is a graph depicting apparent water slab thickness vs. true water slab thickness for various X-ray cone beams.

Invoking a slab approximation to the extremes of thicknesses within the imaged object, we map the respective minimum and maximum apparent thickness values of the object $t'_-$ and $t'_+$, to "true" thickness values $t_-$ and $t_+$. FIG. 9 illustrates such a mapping derived from the curves shown in FIGS. 8A and 8B.

Let $t_s$ represent the thickness of the slab that generates the scatter distribution of maximum magnitude, $S_+$. Three object-dependent scenarios determine the chosen value of $t_s$:

When $t_- > t_c$, we set $t_s = t_-$.
When $t_- \leq t_+ \leq t_c$ we set $t_s = t_+$.
When $t_- \leq t_c \leq t_+$, we set $t_s = t_c$.

During iterations, scatter radiation estimates obtained using $$S_l[m,n] = \sum_{j=1}^{J}\sum_{k=1}^{K}\sum_{l}[j-m, k-n, T_l[j,k], d]I_l[j,k],$$

whose maximum value exceeds the maximum value of $S_+$, are scaled by a factor $k_1$ so as to conform to $S_+$.

With regard to the initialization-based strategy noted above, conventional systems initialize the first iteration with $I_l^0$ set to the value of the acquired image $F_l^0[m,n]$. Since $F_l^0[m,n]$ includes both primary radiation and scatter radiation, this initialization is inappropriate when the SPR is high, primarily because the scatter kernels in $$\sum_{j=1}^{J}\sum_{k=1}^{K}\sum_{l}[j-m, k-n, T_l[j,k], d]I_l[j,k]$$

are scaled by intensities that are many times larger than the true primary intensity. Successive iterates therefore tend to overestimate scatter and include negative values.

Figure 10:
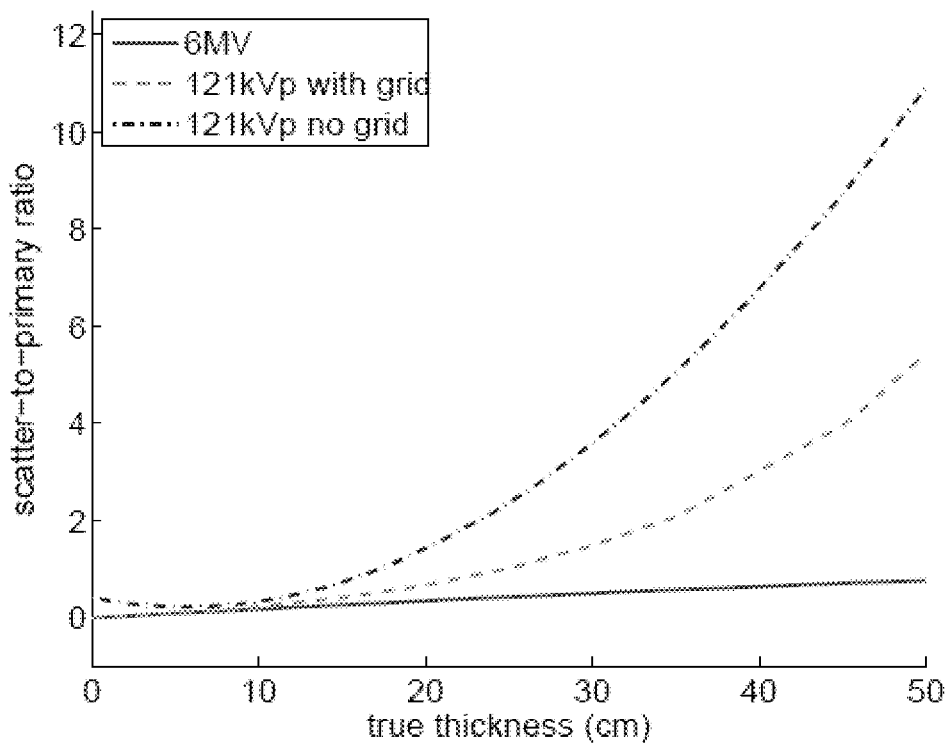
FIG. 10 is a graph depicting SPR vs. true water slab thickness for various X-ray cone beams.

Some embodiments instead estimate an upper bound on SPR, which is denoted $SPR_+$, and set $I_l^0[m,n]=1/(1+SPR_+)\times F_l^0[m,n]=k_2 F_l^0[m,n]$. A useful value for $SPR_+$ may be obtained from the water slab model discussed above. FIG. 10 is a graph illustrating SPR vs. true thickness using the water slab model curves of FIGS. 8A and 8B. We set $SPR_+$ equal to the ratio of $S_+$ and $P_-$, the image generated by the maximally attenuated primary beam that traverses a slice of thickness $t_+$.

Even with this intensity scaling in place, the scatter distribution may be overestimated if the employed scatter kernels are indexed by apparent thickness rather than true thickness. Accordingly, a lower bound $t'_-$ on apparent thickness is calculated using $$\frac{W_{mn}(t)}{W_{mn}(0)} = \frac{I[m,n]}{I^0[m,n]},$$

with $I = P_- + S_+$. The lower bound provides a thickness scaling factor $k_3 = t_+/t'_-$ that is consistent with an SPR equal to $SPR_+$.

The scatter estimate $$\sum_{j=1}^{J}\sum_{k=1}^{K}\sum_{l}[j-m, k-n, T_l[j,k], d]I_l[j,k]$$

for a specific WET is thus modified, on the first iteration, to:

$$S_l^0[m,n] = \sum_{j}^{J}\sum_{k}^{K}\sum_{l}[j-m, k-n, (T_l[j,k]\times \kappa_3), d]F_l^0[j,k]\times \kappa_2,$$

$$\kappa_2 = 1/(1+SPR_+).$$

where

The relationships between apparent thickness, true thickness, SPR and absolute scatter are dependent on the field-size of the incident radiation. The field size is normally determined by the setting of the X-ray collimator. Let $\Omega_c$ denote the intersection of the object shadow $\Omega_o$ and the radiation field $\Omega_r$ in the image plane, assuming that $\Omega_r$ is confined to the active area of the detector. Scatter due to a field $\Omega_c$ may be estimated by convolving the scatter kernel for thickness $t_s$ over the support of the field. In this way, $k_1$ and $k_2$ may be determined on-the-fly, or may be precalculated and saved in a lookup table.

In some imaging geometries, the center of the detector is offset from the radiation beam axis. Accordingly, the center of the object is normally imaged at the edge of the panel. Since the beam intensity and beam spectrum are different relative to the centered-detector geometry, specific lookup tables may be generated for such geometries. For a particular thickness, the scatter image in the table is generated by convolving the relevant kernel by a mask image.

The area of the mask image is determined by finding the fraction of the projection that is "not air"—in other words, that which exceeds some minimum thickness (e.g., 3 cm). For a centered detector, this mask is in the image center: e.g.,

```
000000
000000
001100
001100
000000
000000
```

For an offset detector, the mask for the same object occupation fraction would be:

```
000000
000000
110000
110000
000000
000000
```

The foregoing strategies do not guarantee that $I_l^i[m,n]$ will be non-negative if we apply the subtractive correction $I_l^i[m,n]=I_l^{i-1}[m,n]-S_l^{i-1}[m,n]$. The foregoing multiplicative iteration scheme may therefore be used in some embodiments:

$$I_l^i[m,n] = I_l^0[m,n] \frac{I_l^{i-1}[m,n]}{I_l^{i-1}[m,n] + (\kappa_1 \times S_l^{i-1}[m,n])},$$

where we have modified the known expression to include the scatter scaling term $k_1$. This iteration ensures that all estimates of the primary radiation remain non-negative. Under conditions of convergence of this iteration to the correct scatter image $S_l[m,n]$, $I_l^i[m,n]=I_l^{i-1}[m,n]=P_l[m,n]$, where $P_l[m,n]=I_l^0[m,n]-S_l[m,n]$ is the true primary image. However, this multiplicative scheme does not generally ensure convergence to the primary image. Computational complexity of the above algorithm is $O(N_l^1 i)$ when $J=K=M_l=N_l$ (i.e., full kernel overlap with image at all times), where $i_{max}$ is the total number of iterations. If the scatter kernel supported on a matrix the same size as the image, computation time scales as $O((N_l^1-2N_l^3-2N_l^2)i_{max})$.

As mentioned above, an analytic model of an antiscatter grid may be used to process scatter kernels to accommodate the spatially varying response of such grids. The model may reduce the need for computation-intensive MC simulations of high-resolution digital phantoms of such grids.

Antiscatter grids partially prevent the detection of scattered radiation and thus, in many cases, can increase the signal-to-noise ratio and decrease the SPR of acquired projection images. Since antiscatter grids are commonly encountered in contemporary cone beam imaging systems, the foregoing describes their efficient modeling in conjunction with some embodiments.

Antiscatter grids possess structures of high spatial frequency (e.g., 80 line pairs per cm). Such structures are difficult to model as digital phantoms in MC simulations as the high sampling rates slow the simulations, and since many boundaries and fine structures must be considered. The foregoing analytical method may account for the presence of a grid that is focused in a single direction. In particular, a grid is considered in which the radio-opaque leaves are oriented parallel to the u-axis of the detector.

Figure 11:
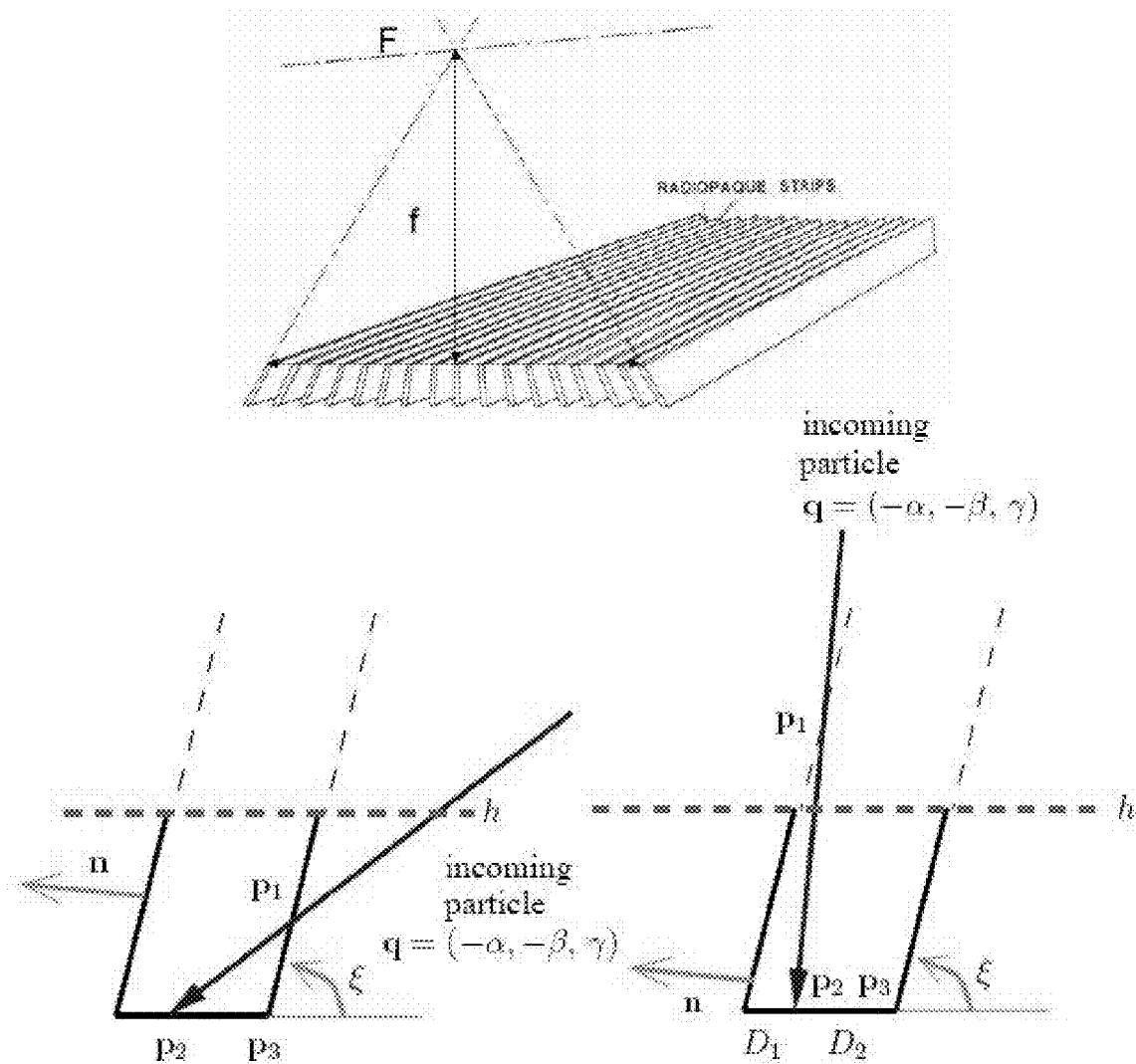
FIG. 11 comprises views to describe photon interaction with an antiscatter grid according to some embodiments.

Consider an incoming particle traveling along the vector $q=(-\alpha, -\beta, \gamma)$ and illustrated in FIG. 11. Let the z-axis of the coordinate system intersect $u=v=0$ perpendicular to the detector plane. The point of putative photon contact with the detector is denoted $p_2$. At this particular v-coordinate, the leaf angle is:

$$\xi = \arctan\left[\frac{f}{|p_2^v|}\right]$$

where $p_2^v$ represents the v component of $p_2$. The outward normal (with respect to the grid center) with respect the blade of the leaf is then:

$$n=(0, sgn(p_2^v)\sin(\xi), \cos(\xi)).$$

$p_3^o$ and $p_3^i$ are then determined, as the intersection points of the outer and inner closest leaves, respectively:

$$p_3^o=(p_2^u, p_2^v+sgn(p_2^v)D_1, p_2^z), p_3^i=(p_2^u, p_2^v-sgn(p_2^v)D_2, p_2^z)$$

For each $p_3$, the intersection point $p_1$, is determined:

$$p_1 = \lambda q + p_2, \lambda = \frac{n \cdot (p_3 - p_2)}{n \cdot q}$$

A photon whose trajectory satisfies the criterion $(p_1^{zi}>h)|(p_1^{zo}>h)$, passes through the grid unattenuated and is assigned a transmission factor of 1. Here, $p_1^{zi}$ and $p_i^{zi}$ represent the z components of the intersection of the particle trajectory with the nearest inner and outer leaves, respectively.

All other photons interact with a leaf and are thus attenuated by the grid. Let d represent the leaf thickness. The value of $p_3$ at the exit face of the leaf is given by:

$$p_3^{di}=(p_2^u, p_2^v-sgn(p_2^v)(D_2+d), p_2^z)$$

when the photon is incident on an inner leaf edge (the v-component of its trajectory is away from the grid center line $v=0$ and by:

$$p_3^{do}=(p_2^u, p_2^v+sgn(p_2^v)(D_1+d), p_2^z) \text{ otherwise.}$$

Let $p_3^d$ and $p_3^0$ represent values of $p_3^0$ at leaf exit and entrance, respectively. Substituting $p_3^d$ and $p_3^0$ for $p_3$ in $$\lambda = \frac{n \cdot (p_3 - p_2)}{n \cdot q}$$

yields $\lambda_d$ and $\lambda_0$, respectively. The thickness of leaf traversed by the photon is thus $\Delta\lambda=\|\lambda_d-\lambda_0\|$. The leaf transmission for the nth photon is calculated as:

$$T_n = e^{-\mu_g(E_n)\Delta\lambda},$$

where $\mu_g(E)$ is the energy-dependent attenuation coefficient for the grid leaf material. The dose due to the photon is scaled by this transmission value.

When such an antiscatter grid is employed, a different scatter kernel is applied for values of v (or index n) of the image. The original equation for determining scatter radiation in the image therefore becomes:

$$S_l[m,n] = \sum_{j=1}^{J}\sum_{k=1}^{K} l[j-m, k-n, T_l[j,k], d, n] I_l[j,k],$$

where $\Sigma_l[m,n,l,d,n]$, is the scatter kernel for column n of the image.

This kernel set may be generated from the same phase space used to create the spatially invariant kernels $\Sigma_i[m,n,t,d]$ by reading the position and direction cosines of each particle, projecting the particle onto the detector, and applying the transmission factor. To calculate the appropriate kernel for a pencil beam incident at the nth column (i.e., at detector co-ordinate $(0, v_n)$), the particles in the original phase space are translated along the v axis by the offset $v_n$ between the detector origin and the center of the nth column. These shifted particles are then propagated through the grid leaf model described above.

Figure 12:
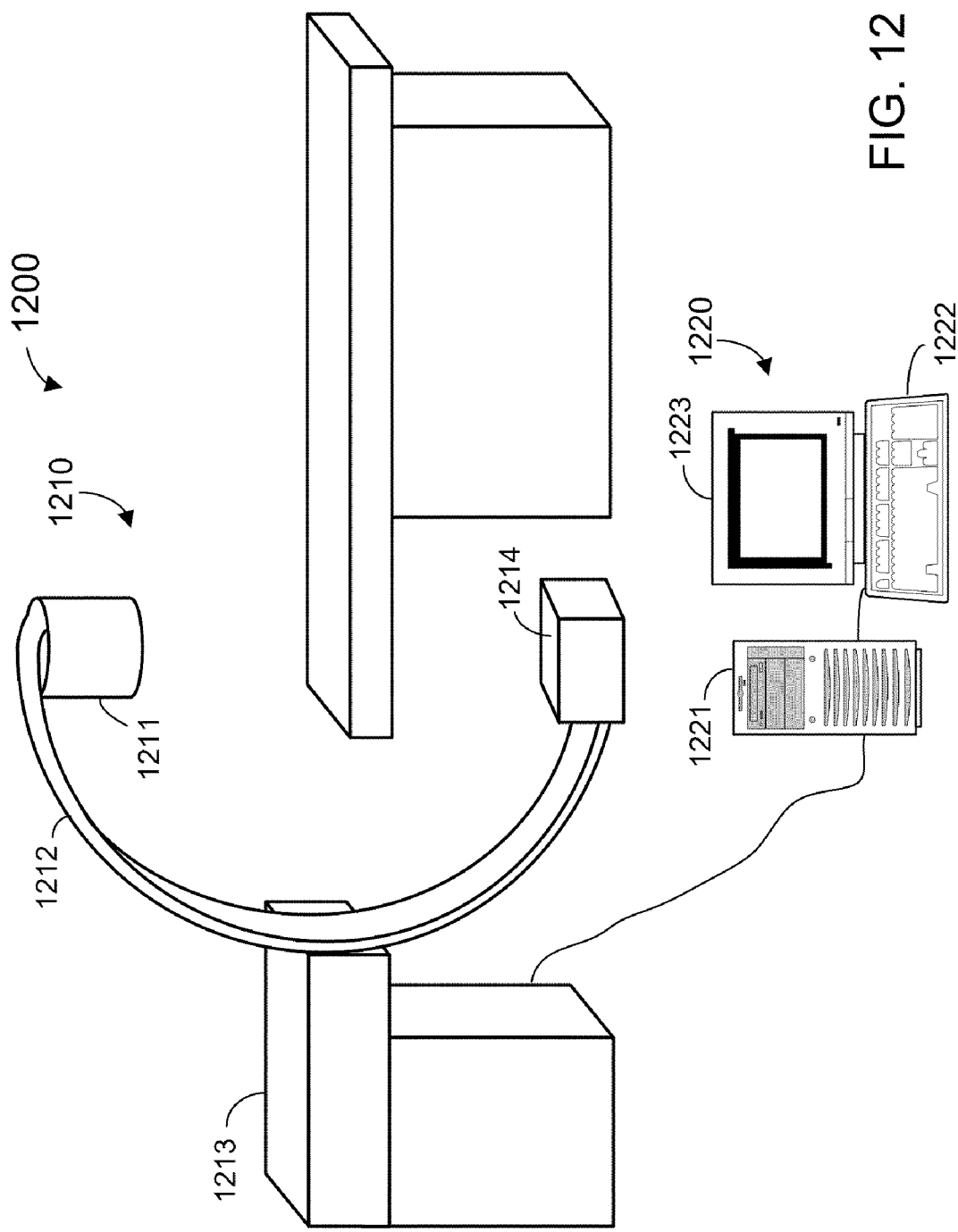
FIG. 12 is a perspective view of a C-arm diagnostic cone beam imaging system according to some embodiments.

FIG. 12 illustrates diagnostic kV cone beam imaging system 1200 according to some embodiments. Imaging system 1200 may be used in conjunction with either or both of processes 200 and 500. For example, imaging system 1200 may be used at S530 to acquire a projection image of an object at a particular source-to-detector distance and a source-to-isocenter distance.

Imaging system 1200 includes kilovoltage imaging system 1210 and operator station 1220. Kilovoltage imaging system 1210 comprises X-ray tube 1211, C-arm 1212, base 1213 and imaging device 1214. X-ray tube 1211 may comprise any suitable device to emit imaging radiation, including but not limited to a Diabolo® X-ray tube. In some embodiments, X-ray tube 1211 emits kilovoltage radiation having energies ranging from 50 to 150 keV. Imaging device 1214 may comprise a flat-panel imaging device using a scintillator layer and solid-state amorphous silicon photodiodes deployed in a two-dimensional array. Imaging device 1214 and X-ray tube 1211 may comprise other types of devices that are or become known.

X-ray tube 1211 and imaging device 1214 may be coupled to C-arm 1212 so as to face one another irrespective of any movement of C-arm 1212 with respect to base 1213. In this regard, C-arm 1212 is slidably mounted on base 1213 and can therefore be moved in order to change the position of X-ray tube 1211. In some embodiments, base 1213 also includes a high-voltage generator for supplying power used by X-ray tube 1211 to generate kilovoltage radiation.

Many C-arm/base configurations may be used in conjunction with some embodiments, including portable configurations, configurations in which base 1213 is rotatably mounted to a ceiling, configurations in which one C-arm is slidably mounted on another C-arm, and configurations incorporating multiple independent C-arms. Embodiments of imaging system 1210 may comprise one of the SIREMOBIL®, MULTISTAR®, BICOR® and POLYSTAR® systems produced by Siemens Corporation® or other systems designed to perform tomography and/or angiography.

Operator station 1220 includes processor 1221 in communication with an input device such as keyboard 1222 and operator display 1223. An operator may operate operator station 1220 to instruct imaging system 1210 to acquire projection images of an internal patient portion and one or more radiation sources delivered to the internal patient portion. Operator station 1220 may also determine scatter kernels as described above and/or estimate scatter radiation within a projection image of an object based on the determined scatter kernels.

The several embodiments described herein are solely for the purpose of illustration. Therefore, persons in the art will recognize from this description that other embodiments may be practiced with various modifications and alterations.

What is claimed is:

1. A computer-implemented method comprising:
   determining, by a computer, a first scatter kernel based on a first energy, a material-equivalent radiological thickness and a first diameter, wherein the first scatter kernel is not a monotonically decreasing function of radial coordinate;
   determining, by the computer, a second scatter kernel based on the first energy, the material-equivalent radiological thickness and a second diameter greater than the first diameter;
   determining, by the computer, a third scatter kernel based on the first scatter kernel and the second scatter kernel, wherein the third scatter kernel is a monotonically decreasing function of radial coordinate; and
   estimating, by the computer, scatter radiation within a projection image of an object based on the third scatter kernel.

2. A method according to claim 1, wherein determining the third scatter kernel comprises:
   calculating an integral of the first scatter kernel from a first finite radius to a second finite radius;
   calculating an integral of the second scatter kernel; and
   scaling the second scatter kernel based on the integral of the first scatter kernel and the integral of the second scatter kernel.

3. A method according to claim 2, wherein the second finite radius is associated with a local minimum of the first scatter kernel.

4. A method according to claim 3, wherein calculating the integral of the second scatter kernel comprises:
   calculating the integral of the second scatter kernel from $r=0$ to $r=\infty$.

5. A method according to claim 2, wherein the estimating the scatter radiation comprises:
   determining a maximum bound of scatter radiation.

6. A method according to claim 5, wherein the estimating the scatter radiation further comprises:
   determining an upper bound of a thickness of the object; and
   determining a lower bound of intensity of an intensity of the projection image.

7. A method according to claim 6, wherein the estimating the scatter radiation further comprises:
   performing multiplicative iteration to prevent negative estimates of primary radiation within the projection image.

8. A method according to claim 1, wherein the estimating the scatter radiation comprises:
   determining a maximum bound of scatter radiation.

9. A method according to claim 8, wherein the estimating the scatter radiation further comprises:
   determining an upper bound of a thickness of the object; and
   determining a lower bound of intensity of an intensity of the projection image.

10. A method according to claim 9, wherein the estimating the scatter radiation further comprises:
    performing multiplicative iteration to prevent negative estimates of primary radiation within the projection image.

11. A method according to 1, wherein the estimating the scatter radiation comprises:
    performing multiplicative iteration to prevent negative estimates of primary radiation within the projection image.

12. A method according to claim 1, further comprising:
exposing a detector to an imaging system beam to generate a gain correction image;
smoothing the gain correction image;
fitting the smoothed image to an average profile of the gain correction image to form a two-dimensional profile image;
dividing the gain correction image by the two-dimensional profile image to produce an approximated uniform illumination gain correction image; and
performing gain correction on the projection image using the approximated uniform illumination gain correction image prior to estimating the scatter radiation.

13. A method according to claim 12, wherein the imaging system beam is approximately radially-symmetric, and
wherein fitting the smoothed image comprises fitting the smoothed image to a mean or a median radial profile of the gain correction image to form a two-dimensional profile image.

14. A method according to claim 12, wherein the imaging system beam exhibits a ramp-like intensity gradient across an area of the detector, and
wherein fitting the smoothed image comprises fitting the smoothed image to a mean or median profile perpendicular to the direction of the gradient to form a two-dimensional profile image.

15. A method according to claim 1, further comprising:
exposing a detector to an imaging system beam to generate a gain correction image;
smoothing the gain correction image;
fitting the smoothed image to an average profile of the gain correction image to form a two-dimensional profile image;
dividing the gain correction image by the two-dimensional profile image to produce an approximated uniform illumination gain correction image; and
multiplying the estimated scatter radiation by the smoothed image.

16. An apparatus comprising:
a radiation source to emit radiation;
an imaging device to acquire a projection image of an object based on the radiation; and
a processor to:
determine a first scatter kernel based on a first energy, a material-equivalent radiological thickness and a first diameter, wherein the first scatter kernel is not a monotonically decreasing function of radial coordinate;
determine a second scatter kernel based on the first energy, the material-equivalent radiological thickness and a second diameter greater than the first diameter;
determine a third scatter kernel based on the first scatter kernel and the second scatter kernel, wherein the third scatter kernel is a monotonically decreasing function of radial coordinate; and
estimate scatter radiation within the projection image of the object based on the third scatter kernel.

17. An apparatus according to claim 16, wherein determination of the third scatter kernel comprises:
calculation of an integral of the first scatter kernel from a first finite radius to a second finite radius;
calculation of an integral of the second scatter kernel; and
scaling of the second scatter kernel based on the integral of the first scatter kernel and the integral of the second scatter kernel.

18. An apparatus according to claim 17, wherein the second finite radius is associated with a local minimum of the first scatter kernel, and
wherein calculation of the integral of the second scatter kernel comprises calculation of the integral of the second scatter kernel from $r=0$ to $r=\infty$.

19. A non-transitory medium storing program code, the program code comprising:
code to determine a first scatter kernel based on a first energy, a material-equivalent radiological thickness and a first diameter, wherein the first scatter kernel is not a monotonically decreasing function of radial coordinate;
code to determine a second scatter kernel based on the first energy, the material-equivalent radiological thickness and a second diameter greater than the first diameter;
code to determine a third scatter kernel based on the first scatter kernel and the second scatter kernel, wherein the third scatter kernel is a monotonically decreasing function of radial coordinate; and
code to estimate scatter radiation within the projection image of the object based on the third scatter kernel.

20. A non-transitory medium according to claim 19, wherein the code to determine the third scatter kernel comprises:
code to calculate an integral of the first scatter kernel from a first finite radius to a second finite radius;
code to calculate an integral of the second scatter kernel; and
code to scale the second scatter kernel based on the integral of the first scatter kernel and the integral of the second scatter kernel.

21. A non-transitory medium according to claim 20, wherein the second finite radius is associated with a local minimum of the first scatter kernel, and
wherein the code to calculate the integral of the second scatter kernel comprises code to calculate the integral of the second scatter kernel from $r=0$ to $r=\infty$.

* * * * *